Jan. 19, 1926.
J. C. KELSCH
1,570,569
REAR SEAT WINDSHIELD
Filed Sept. 16, 1924
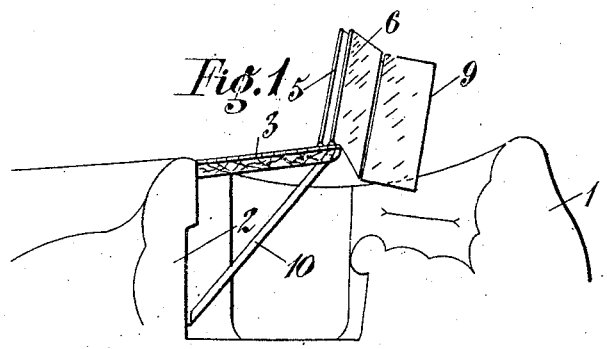
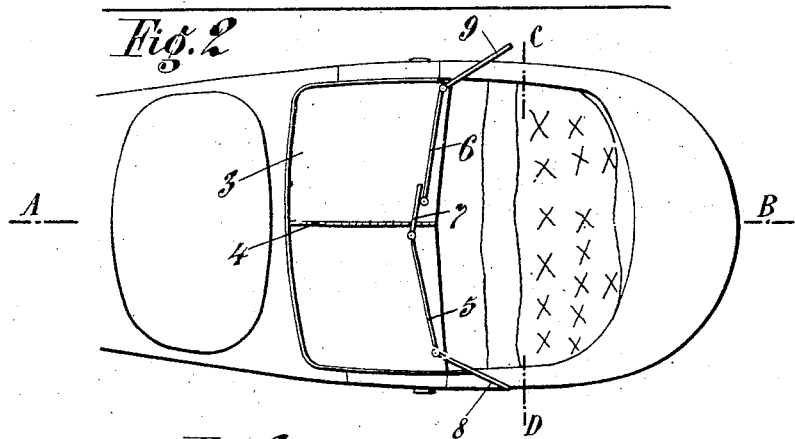
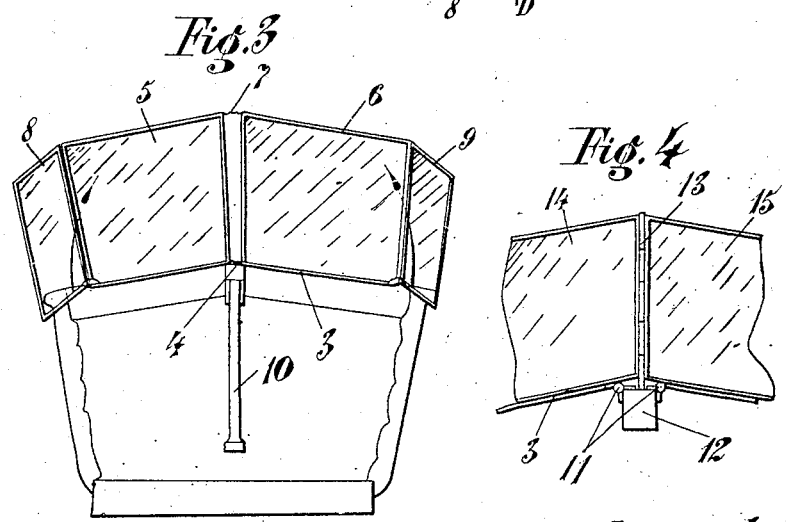
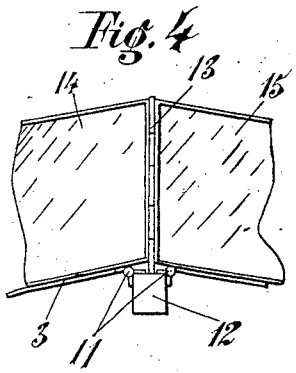
Inventor
J. C. Kelsch
By
Atty Patented Jan. 19, 1926.

1,570,569

UNITED STATES PATENT OFFICE.

JEAN CLÉMENT KELSCH, OF LEVALLOIS-PERRET, FRANCE.

REAR-SEAT WINDSHIELD.

Application filed September 16, 1924. Serial No. 738,094.

*To all whom it may concern:*

Be it known that I, JEAN CLÉMENT KELSCH, citizen of Republic of France, and resident of Levallois-Perret, in the Department of Seine, France, have invented certain new and useful Rear-Seat Windshields, of which the following is a specification.

This invention relates to wind screens for motor vehicles, and more particularly to the rear wind screens of motor cars of the "torpedo-body", and like types.

In motor vehicles of the "torpedo-body" type, the occupants of the rear seats derive slight protection from the wind screen situated in front of the driver. It has been thought to remedy this defect by providing the back of the driver's seat with an arrangement for protecting them from the wind. This arrangement is insufficiently effective.

The object of the present invention consists in a shield disposed horizontally on the sides of the body of the motor vehicle, to protect the legs of occupants. On this shield wind screens are disposed, provided or not, as desired, with attachable screens for the purpose of diverting the wind out of the path of the vehicle.

In order to allow an easy entrance to and exit from the rear seats, the shield is divided at or near the middle thereof into two parts connected by a hinge.

Each movable portion of the shield supports a small screen forming a guard against the wind, the extremities of which screens are, or may be, provided with shutters capable of being connected to the wind screens to permit of easy manoeuvring of the shield.

One embodiment of the invention is shown by way of example and with reference to the annexed drawings, whereon:—

Fig. 1 is a longitudinal section;
Fig. 2 is a plan view;
Fig. 3 is a transverse section on the line C. D.
Fig. 4 is a diagrammatic cross section of a modified construction.

The numeral 1 designates a motor vehicle body of which the rear portion alone is represented.

2 is the back of the driver's seat in which is placed a shield formed in two parts or panels 3, joined by the intermediate hinge 4 permitting of the opening of the right panel or of the left, for passage into or out of the vehicle.

On the upper part of each panel two wind screens 5 and 6 are disposed, which wind screens are capable of being placed vertically, or disposed at a slight angle to each other to enable the screen to turn aside or cut through the wind more easily, in such a manner as to avoid collision of the wind screens when opening the panels. These wind screens may be inclinable or not as desired.

On the wind screen 5 a shutter 7 is connected for the purpose of closing the empty space between the two fixed wind screens, whilst the two outer extremities of the wind screens 5 and 6 are each provided with a movable shutter or side section 8, 9 protecting the occupants, in directing the air streams towards the sides and out of the path of the vehicle.

The shield is maintained on the motor vehicle body by the hinge 4 and to avoid this latter being subjected to too great a strain, a strut 10 or the like, is disposed vertically or obliquely under the same.

From the foregoing it is easy to understand that in order to enter the vehicle, it is sufficient to turn back the outer shutters, or sections 8 and 9 on their wind screens 5 and 6 respectively, to turn back in a similar manner the shutter 7 on the wind screen 5, to permit of the panels being swung around the hinge 4.

The extremities of the panels resting on the sides of the body of the motor vehicle close the space under the wind screens, thus protecting the legs of the occupants, not only from wind but also from inclement weather.

In Fig. 4 a modified construction is shown in which the movable parts of the shield 3 instead of being connected to a single hinge are, for example, connected to two hinges 11 mounted on an extension 12 fixed at one end to the back of the driver's seat, and supported at the other by a strut 10 or the like.

On this extension, an axle 13 is vertically disposed, about which axle shutters 14 and 15 serving as wind screens, are connected. It is easy to understand that if for example the screen 14 is folded over on the screen 15 the left panel will be capable of being opened without difficulty to allow of easy entrance into the motor vehicle body. The screens 14 and 15 can even be turned back into the mid position in order to raise both parts of the shield simultaneously. It is evident that the extension 12 and the two hinges 11 can be replaced by a single hinge on which the axle 13 would be fixed, the hinge may equally be fixed to one of the movable panels, as for instance, that on the right, whereupon the turning back of the left screen on to the right will permit of opening the left panel. This turning back made, the right panel may be opened. The right screen in this case may be immovable.

To prevent the movable screens being shifted by the velocity of the vehicle, pins or other fixing arrangements are provided to maintain them in determined positions.

It goes without saying that the present invention is not strictly limited to the example described and illustrated, but can vary in form, dimensions and proportions, in details of construction and material according to practical requirements.

Having now particularly described and ascertained the nature of my said invention and in what manner the same is to be performed, I declare that what I claim is:—

1. A wind shield for the rear seat of motor vehicles, comprising panels overlying the space in advance of the rear seat and movably connected in the longitudinal center of the vehicle to permit swinging movement of said panels, and a wind screen carried by and projecting upwardly from each panel.

2. A wind shield for the rear seat of motor vehicles, comprising panels overlying the space in advance of the rear seat and movably connected in the longitudinal center of the vehicle to permit swinging movement of said panels, and a wind screen carried by and projecting upwardly from each panel, said wind screens terminating short of the inner edges of the panels, and a movable shutter carried by one of the wind screens to bridge the space between the adjacent ends of said screens when the parts are in operative positions.

3. A wind shield for the rear seat of motor vehicles, comprising panels adapted to overlie the space in advance of the rear seat and hingedly connected at their inner ends in the longitudinal plane of the vehicle, and wind screens fixed to the upper surfaces of the panels and bodily movable therewith.

4. A wind shield for the rear seat of motor vehicles, comprising horizontally disposed panels overlying the space in advance of the rear seat, a member extending longitudinally of the vehicle, a hinged connection between said member and the adjacent edges of the panels, and a support for the end of the member next the rear seat.

5. A wind shield for the rear seat of motor vehicles, comprising horizontally disposed panels overlying the space in advance of the rear seat, a member extending longitudinally of the vehicle, a hinged connection between said member and the adjacent edges of the panels, and a support for the end of the member next the rear seat, and a wind screen carried by each panel adjacent the edge thereof next the rear seat.

JEAN CLÉMENT KELSCH.